(12) United States Patent
Lee et al.

(10) Patent No.: US 8,171,189 B2
(45) Date of Patent: *May 1, 2012

(54) SEMICONDUCTOR APPARATUS

(75) Inventors: Ji Wang Lee, Gyeonggi-do (KR); Hee Woong Song, Gyeonggi-do (KR); Tae Jin Hwang, Gyeonggi-do (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 156 days.

This patent is subject to a terminal disclaimer.

(21) Appl. No.: 12/648,524

(22) Filed: Dec. 29, 2009

(65) Prior Publication Data

US 2011/0029700 A1 Feb. 3, 2011

(51) Int. Cl.
G06F 3/00 (2006.01)
G06F 5/00 (2006.01)

(52) U.S. Cl. ........................................................ 710/61

(58) Field of Classification Search ................... 710/61
See application file for complete search history.

(56) References Cited

U.S. PATENT DOCUMENTS

| 5,703,513 | A | 12/1997 | Hashizume et al. |
| 6,081,477 | A | 6/2000 | Li |
| 6,173,432 | B1 | 1/2001 | Harrison |
| 6,232,811 | B1 | 5/2001 | Ihm |
| 6,529,423 | B1 | 3/2003 | Yoon et al. |
| 7,127,017 | B1 | 10/2006 | Evans et al. |
| 7,234,070 | B2 | 6/2007 | James |
| 7,826,306 | B2 * | 11/2010 | Lee et al. .................. 365/233.1 |
| 2007/0002644 | A1 | 1/2007 | Kang |

FOREIGN PATENT DOCUMENTS

| JP | 09-074337 A | 3/1997 |
| JP | 11-328963 A | 11/1999 |
| KR | 1019960032662 A | 9/1996 |
| KR | 1019990057223 A | 7/1999 |
| KR | 1020060106625 A | 10/2006 |
| KR | 100945816 B1 | 2/2010 |

\* cited by examiner

*Primary Examiner* — Chun-Kuan Lee
(74) *Attorney, Agent, or Firm* — Ladas & Parry LLP

(57) ABSTRACT

A semiconductor apparatus includes a clock input buffer, an asynchronous data input buffer, and a synchronous data input buffer. The clock input buffer is configured to buffer an external clocks in order to generate an internal clock. The asynchronous data input buffer is configured to buffer data input through a data pad and output the buffered data. The synchronous data input buffer is configured to be synchronous with the internal clock to buffer the buffered data. The semiconductor apparatus is arranged so that the length of a line for transferring the internal clock to the synchronous data input buffer and the length of a line for transferring the buffered data to the synchronous data input buffer are substantially equal to each other.

11 Claims, 3 Drawing Sheets

SEMICONDUCTOR APPARATUS

CROSS-REFERENCES TO RELATED PATENT APPLICATION

The present application claims priority under 35 U.S.C 119(a) to Korean Application No 10-2009-0070787, filed on Jul. 31, 2009, in the Korean Intellectual Property Office, which is incorporated herein by reference in its entirety as set forth in full.

BACKGROUND

1. Technical Field

An embodiment of the present invention described herein relates generally to a semiconductor apparatus, and more particularly, to a data input circuit of a semiconductor apparatus.

2. Related Art

A typical semiconductor apparatus includes a plurality of data pads and a plurality of data input buffers that are electrically connected to the data pads in order to perform a data input operation. The plurality of data input buffers perform a buffering operation on data input through the data pads in response to internal clocks. In order that the buffering operation of the data input buffer is performed in the desired manner, the timings of the internal clocks and the data transferred to the data input buffer should be as closely matched as possible.

The difference between these timings at which the semiconductor apparatus still performs normally is dependent upon the speed of operation. In general, as the operation speed of the semiconductor apparatus increases, the permitted difference in timings between the internal clocks and the data transferred to each data input buffer is gradually reduced. In addition, a timing margin is reduced due to a skew difference in the internal clocks transferred to each data input buffer. Thus, as the operation speed of the semiconductor apparatus increases, it becomes more difficult to secure the stable operation of the data input circuit.

In order to solve the above problems, the components of a conventional semiconductor apparatus are arranged so that each data input buffer is disposed adjacent to one other. Further, the lengths of the input lines of data are configured to be equal to each other so that the distance between the respective data pads and their corresponding data input buffers are uniform.

The data input circuit of the conventional semiconductor apparatus will be described in detail with reference to FIG. 1. FIG. 1 is a diagram showing a configuration disclosed in Korean Patent Publication No. 10-1999-0057223.

FIG. 1 is a configuration diagram of the data input circuit of the conventional semiconductor apparatus. For convenience of explanation, FIG. 1 schematically shows only configurations of buffering the data input through five data pads.

Referring to FIG. 1, the data input circuit of the conventional semiconductor apparatus is provided with five data pads 1-1 to 1-5. Each data pad 1-1 to 1-5 is electrically connected to one of five data input buffers 3-1 to 3-5 through one of the data lines 2-1 to 2-5. Five data input buffers 3-1 to 3-5 buffer input data 'din1' to 'din5' transferred through the data lines 2-1 to 2-5 and output the buffered data 'dbuf1' to 'dbuf5'. In order to perform the buffering operation, five data input buffers 3-1 to 3-5 receive an internal clock 'clk_int'.

As shown in FIG. 1, the five data input buffers 3-1 to 3-5 are arranged to be adjacent to each other. Therefore, although the internal clock 'clk_int' is implemented as a high frequency clock, the timing difference between the data transferred to each data input buffer 3-1 to 3-5 is minimal. All of the five data lines 2-1 to 2-5 provided amongst the five data pads 1-1 to 1-5 and five data input buffers 3-1 to 3-5 have the same length. As shown, the five data lines 2-1 to 2-5 each have different shapes, includes a twisted type shape, in order to achieve equal lengths. The additional turns of the data lines required to accomplish equal lengths consume additional space in the semiconductor apparatus. Furthermore, coupling noise may occur due to the twisted shape of certain ones of the data lines 2-1 to 2-5.

SUMMARY

In one embodiment of the present invention, a semiconductor apparatus includes: a clock input buffer configured to buffer external clocks to generate internal clocks; an asynchronous data input buffer configured to buffer data input through data pads and outputs the buffered data; and a synchronous data input buffer configured to be synchronous with the internal clocks to buffer the buffered data, wherein a length of a line transferring the internal clocks to the synchronous data input buffer and a length of a line transferring the buffered data to the synchronous data input buffer are equal to each other.

In another embodiment of the present invention, a semiconductor apparatus includes: an asynchronous data input buffer configured to buffer data input through a first data pad and outputs the buffered data; a synchronous data input buffer configured to be synchronous with internal clocks to buffer the buffered data; and a loading unit configured to be electrically connected to transmission lines of the buffered data, wherein a length of a line transferring the internal clocks from the clock input buffer to the synchronous data input buffer and a length of a line transferring the buffered data to the synchronous data input buffer are equal to each other.

In still another embodiment of the present invention, a semiconductor apparatus includes: an asynchronous data buffer group configured to include first to N-th asynchronous data input buffers that are sequentially disposed at a predetermined interval; a clock input buffer configured to be disposed at a predetermined distance from the asynchronous data buffer group; first to N-th synchronous data input buffers configured to be sequentially disposed at a predetermined interval; and a synchronous data buffer group configured to be disposed at a central area of the asynchronous data buffer group and the clock input buffer.

These and other features, aspects, and embodiments are described below in the section "Detailed Description."

BRIEF DESCRIPTION OF THE DRAWINGS

Features, aspects, and embodiments are described in conjunction with the attached drawings, in which.

DETAILED DESCRIPTION

Hereinafter, embodiments of the present invention will be described in detail with reference to the accompanying drawings.

Figure 1:
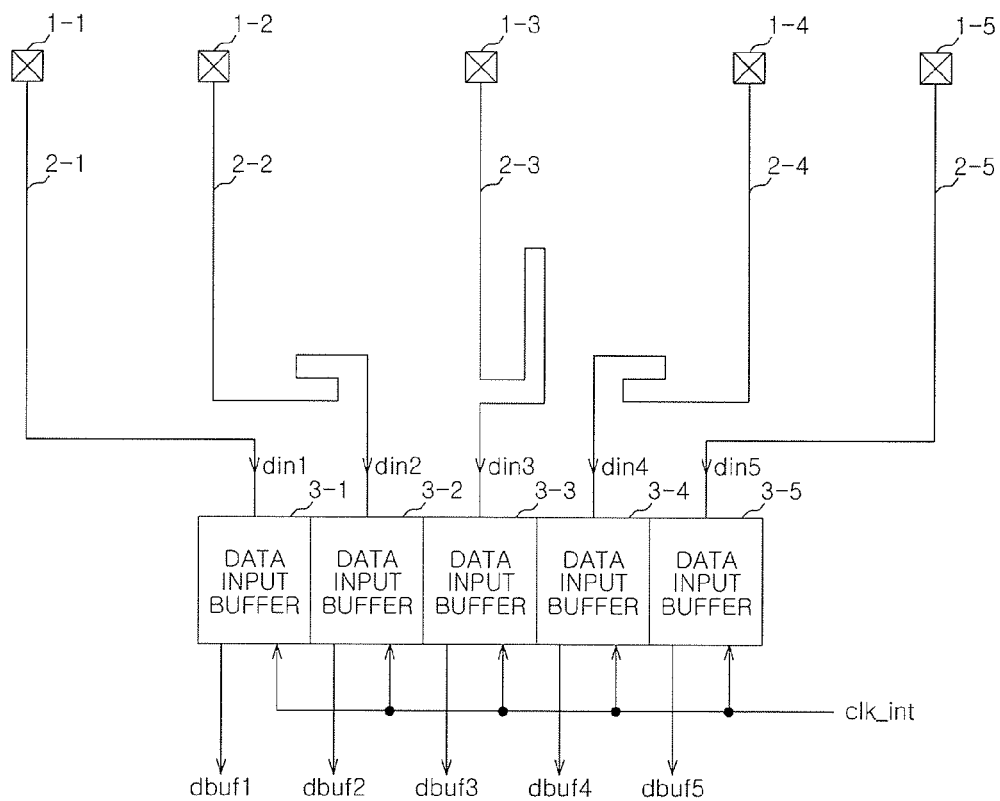
FIG. 1 is a configuration diagram of a data input circuit of a conventional semiconductor apparatus.
Figure 2:
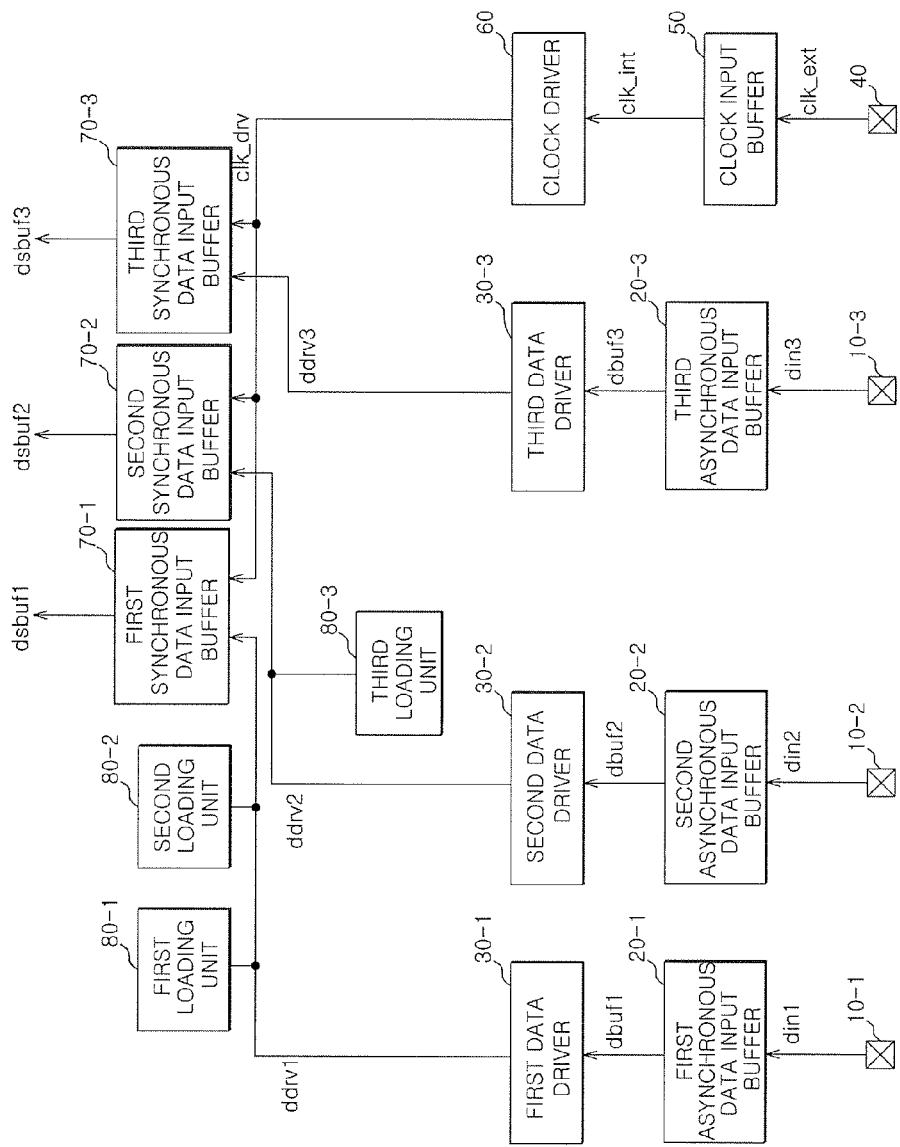
FIG. 2 is a first exemplary diagram showing a configuration of a semiconductor apparatus according to one embodiment of the present invention.

FIG. 2 is a first exemplary diagram showing a configuration of a semiconductor apparatus according to one embodiment. For convenience of explanation, only the configuration of the buffering data input through three data pads are schematically shown.

As shown in FIG. 2, the semiconductor apparatus according to one embodiment includes first to third data pads 10-1 to 10-3, first to third asynchronous data input buffers 20-1 and 20-3, first to third data drivers 30-1 to 30-3, a clock pad 40, a clock input buffer 50, a clock driver 60, and first to third synchronous data input buffers 70-1 to 70-3.

First to third input data 'din1' to 'din3' are transferred from the first to third data pads 10-1 to 10-3, respectively. The first to third asynchronous data input buffers 20-1 to 20-3 buffers the first to third input data 'din1' to 'din3' in order to generate first to third buffered data 'dbuf1' to 'dbuf3'. Moreover, first to third data drivers 30-1 to 30-3 drive the first to third buffered data 'dbuf1' to 'dbuf3' to generate first to third driving data 'ddrv1' to 'ddrv3'. Further, the clock input buffer 50 buffers an external clock 'clk_ext' transferred from the clock pad 40 to generate an internal clock 'clk_int'. In addition, the clock driver 60 drives the internal clock 'clk_int' to generate a driving clock 'clk_drv'. Also, the first to third synchronous data input buffers 70-1 to 70-3 are synchronous with the driving clock 'clk_drv' to buffer any one of the predetermined first to third driving data 'ddrv1' to 'ddrv3' and generate each of the first to third synchronous buffering data 'dsbuf1 to dsbuf3'.

In an embodiment, the first to third data drivers 30-1 to 30-3 and the clock driver 60 may be omitted. The first to third data drivers 30-1 to 30-3 and the clock driver 60 are provided, making it possible to improve the signal characteristics of each data and each clock. At this time, it is preferable that all the first to third data drivers 30-1 to 30-3 and the clock driver 60 have the same driving force.

As such, in the semiconductor apparatus according to one embodiment, data input buffer operations for input data are performed by both an asynchronous input buffer and a synchronous input buffer. The first to third asynchronous data input buffers 20-1 to 20-3 buffer the first to third input data 'din1' to 'din3' irrespective of the input of the clocks. On the other hand, each of the first to third synchronous data input buffers 70-1 to 70-3 uses the driving clock 'clk_drv" generated from the internal clock 'clk_int' to buffer the corresponding first to third driving data 'ddrv1' to 'ddrv3'.

In the embodiment shown in FIG. 2, the length of a signal line that transfers the first buffered data 'dbuf1' output from the first asynchronous data input buffer 20-1 to the first synchronous data input buffer 70-1 and the length of a signal line that transfers the internal clock 'clk_int' output from the first clock input buffer 50 to the first synchronous data input buffer 70-1 are designed to be substantially equal to each other. Likewise, a length of a signal line that transfers the second buffered data 'dbuf2' to the second synchronous data input buffer 70-2 and the length of a signal line that transfers the third buffered data 'dbuf3' to the third synchronous data input buffer 70-3 are designed to be substantially equal to the length of a signal line that transfers the internal clock 'clk_int' to the second synchronous data input buffer 70-2 and length of a signal line that transfers the internal clock 'clk_int' to the third synchronous data input buffer 70-3, respectively. Accordingly, the signal path transferring data of any one of the first to third asynchronous data input buffers 20-1 to 20-3 to its counterpart synchronous data input buffer is designed to be substantially equal to the corresponding internal clock signal path transferring the internal clock to that synchronous data input buffer.

In an embodiment, a separate signal line for transferring each first to third driving data 'ddrv1' to ddrv3' is provided; but only one line for transferring the driving clock 'clk_drv' is provided. Therefore, in the embodiment shown in FIG. 2, the driving clock 'clk_drv' transferred to the first synchronous data input buffer 70-1 is affected by each loading owned by the second synchronous data input buffer 70-2 and the third synchronous data input buffer 70-3, thereby delaying the timings. In order to prevent a timing difference between the data and the clocks due caused by this phenomenon, a first loading unit 80-1 and a second loading unit 80-2 are provided to be electrically connected to the transmission line of the first driving data 'ddrv1'. Herein, it is preferable that the first loading unit 80-1 and the second loading unit 80-2 have the same loading value (generally, the same R-C value) as the second synchronous data input buffer 70-2 and the third synchronous data input buffer 70-3, respectively. For the same reason, it is preferable that the third loading unit 80-3 is electrically connected to the transmission line of the second driving data 'ddrv2', and the third loading unit 80-3 has the same loading value as the third synchronous data input buffer 70-3.

As a result, the loading value of the signal line that transfers the first driving data 'ddrv1' to the first synchronous data input buffer 70-1 and the loading value of the signal line that transfers the driving clock 'clk_drv' to the first synchronous data input buffer 70-1 are designed to be substantially equal to each other. Likewise, the loading value of the signal line that transfers the second driving data 'ddrv2' to the second synchronous data input buffer 70-2 and the loading value of the signal line that transfers the driving clock 'clk_drv' to the second synchronous data input buffer 70-2 are designed to be substantially equal to each other. Further, the loading value of the signal line that transfers the third driving data 'ddrv3' to the third synchronous data input buffer 70-3 and the loading value of the signal line that transfers the driving clock 'clk_dry' to the third synchronous data input buffer 70-3 are designed to be substantially equal to each other.

As such, the first synchronous data input buffer 70-1 can receive the driving clock 'clk_drv' and the first driving data 'ddrv1' at the same timing, the second synchronous data input buffer 70-2 can receive the driving clock 'clk_drv' and the second driving data 'ddrv2' at the same timing, and the third synchronous data input buffer 70-3 can receive the driving clock 'clk_drv' and the third driving data 'ddrv3' at the same timing. Therefore, the timing margin between the data and the clocks input to each of the first to third synchronous data input buffers 70-1 to 70-3 is increased, making it possible to more stably perform the buffering operation on the input data.

Of course, the generation timing of the first to third synchronous buffering data 'dsbuf1' to 'dsbuf3' may differ from each other. However, in a technology of improving the stability of the data input operation of the semiconductor apparatus, it is noted that whether the first to third synchronous buffering data 'dsbuf1 to dsbuf3' are stably generated is important, but the generation timing is less important.

Meanwhile, referring back to FIG. 2, the first to third asynchronous data input buffers 30-1 to 30-3 are not necessarily disposed adjacent to each other. Further, the third synchronous data input buffers 70-1 to 70-3 also need not be disposed adjacent. Accordingly, the typical factors limiting the available space inside a semiconductor apparatus are prevented or removed when data signal paths and their clock signal paths are designed as shown in FIG. 2, whereby the area efficiency of a semiconductor apparatus can be improved.

Figure 3:
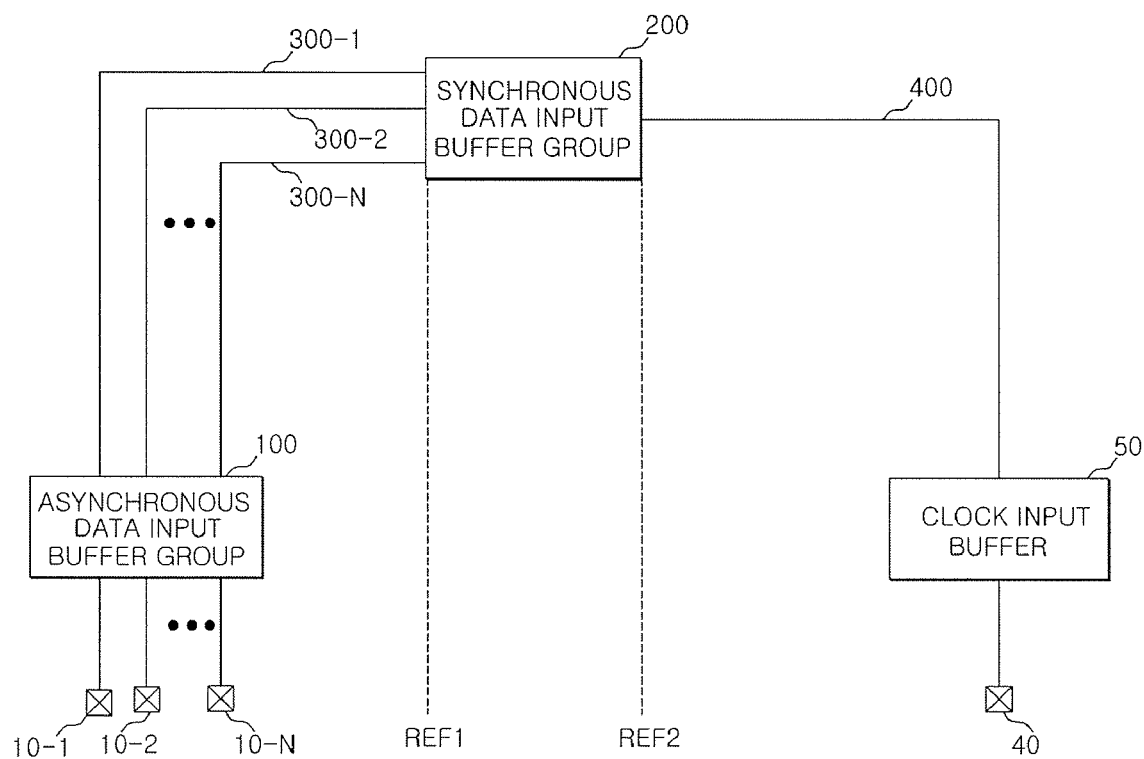
FIG. 3 is a second exemplary diagram showing a configuration of the semiconductor apparatus of FIG. 2.

FIG. 3 is a second exemplary diagram showing a configuration of the semiconductor apparatus of FIG. 2.

Referring to FIG. 3, the semiconductor apparatus includes the clock input buffer 50, an asynchronous data buffer group 100, and a synchronous data buffer group 200. Herein, unlike FIG. 2, the data driver and the clock driver are not provided.

The asynchronous data buffer group 100 includes first to N-th asynchronous data input buffers (not shown) that are sequentially disposed at a predetermined interval (N is a positive integer of 2 or more). In addition, the synchronous data buffer group 200 includes first to N-th synchronous data buffer (not shown) that are sequentially disposed at the predetermined interval. Each of the asynchronous data input buffers is electrically connected to one of the first to N-th data pads 10-1 to 10-N. In addition, it can be easily understood that the buffered data from the asynchronous data input buffers are electrically connected to the synchronous data input buffer through lines 300-1 to 300-N.

The clock input buffer 50 is electrically connected to the clock pad 40 and the synchronous data input buffer group 200 and is disposed at a predetermined distance from the asynchronous data buffer group 100.

The synchronous data buffer group 200 is disposed at the central area of the asynchronous data buffer group 100 and the clock input buffer 50. Herein, the central area means an area between a first reference line 'REF1', where the first reference line REF1 is equidistant from the first asynchronous data input buffer and from the clock buffer, and a second reference line 'REF2', where the second reference line 'REF2' is equidistant from the N-th asynchronous data input buffer and the clock buffer.

For any one of the first to N-th synchronous data input buffers, the length of a line 400 that transfers a clock signal from the clock input buffer 50 and a length of a line '300-<i>' that transfers data from any one of the first to N-th asynchronous data input buffers are designed to be substantially equal to each other. In addition, a loading unit (e.g., the loading unit shown in FIG. 2) may be electrically connected to any one or more of the lines '300-<i>' that transfers data to any one of the first to N-th synchronous data input buffers from any one of the first to N-th asynchronous data input buffers. At this time, the loading value of the loading unit is such that the loading value of the line 400 that transfers the clock signal from the clock input buffer 50 to the corresponding synchronous data input buffer connected to the line '300-<i>' to which the loading unit is electrically connected is substantially equal to the loading value of the line '300-<i>' that transfers the data from any one of the first to N-th asynchronous data input buffers to the corresponding synchronous data input buffer.

As described above, the semiconductor apparatus of embodiments of the present invention includes a data input buffer that is divided into an asynchronous data input buffer and a synchronous data input buffer. The length of the signal line between the synchronous data input buffer and the asynchronous input buffer and the length of the signal line between the synchronous data input buffer and the clock input buffer are the same. Therefore, the timing margin between the data input to the synchronous input buffer and a clock signal is improved, whereby the stability of the buffering operation of the input data is improved. In addition, the area efficiency inside the semiconductor apparatus is improved due to the arrangement of the data input buffers in the semiconductor apparatus according to an embodiment of the present invention. As such, embodiments provide technical elements capable of more easily implementing high speed operation and high integration of a semiconductor apparatus.

While certain embodiments have been described above, it will be understood to those skilled in the art that the embodiments described are by way of example only. Accordingly, the apparatus described herein should not be limited based on the described embodiments. Rather, the apparatus described herein should only be limited in light of the claims that follow when taken in conjunction with the above description and accompanying drawings.

What is claimed is:

1. A semiconductor apparatus, comprising:
  a clock input buffer configured to buffer an external clock to generate an internal clock;
  an asynchronous data input buffer configured to buffer data input through a data pad and to output the buffered data; and
  a synchronous data input buffer configured to be synchronous with the internal clock to buffer the buffered data,
  wherein a length of a line transferring the internal clock to the synchronous data input buffer and a length of a line transferring the buffered data to the synchronous data input buffer are substantially equal to each other.

2. The semiconductor apparatus of claim 1, further comprising:
  a clock driver configured to drive the internal clock output and to transfer the driven internal clock to the synchronous data input buffer; and
  a data driver configured to drive the buffered data output by the asynchronous data input buffer and to transfer the driven buffered data to the synchronous data input buffer.

3. The semiconductor apparatus of claim 2, wherein the clock driver and the data driver are configured to have the same driving force.

4. The semiconductor apparatus of claim 1, further comprising:
  a loading unit electrically connected to a transmission line of the buffered data for transferring the buffered data to the synchronous data input buffer.

5. The semiconductor apparatus of claim 4, wherein a loading value of the loading unit is set so that a loading value of the transmission line of the buffered data is substantially equal to a loading value of the transmission line that transfers the internal clock to the synchronous data input buffer.

6. A semiconductor apparatus, comprising:
  an asynchronous data buffer group including first to N-th asynchronous data input buffers that are sequentially disposed at a predetermined interval from each other and configured to buffer data input through a data pad and to output the buffered data, wherein N is a positive integer of 2 or more;
  a clock input buffer disposed at a predetermined distance from the asynchronous data buffer group and configured to buffer an external clock to generate an internal clock; and
  a synchronous data buffer group including first to N-th synchronous data input buffers that are sequentially disposed at a predetermined interval from each other,
  wherein the synchronous data buffer group is disposed at a central area of the asynchronous data buffer group and the clock input buffer, and the synchronous data buffer group configured to be synchronous with the internal clock to buffer the buffered data,
  wherein for any one of the first to N-th synchronous data input buffers, a length of a line that transfers a clock signal from the clock input buffer to a corresponding one of the first to N-th synchronous data input buffers and a length of a line that transfers data from the any one of the first to N-th asynchronous data input buffers to the corresponding one of the first to N-th synchronous data input buffers are substantially equal to each other.

7. The semiconductor apparatus of claim 6, wherein the central area of the asynchronous data buffer group and the clock input buffer is an area between a first reference line located equidistant from the first asynchronous data input buffer and the clock buffer and a second reference line located equidistant from the N-th asynchronous data input buffer and the clock buffer.

8. The semiconductor apparatus of claim 6, wherein a loading unit is electrically connected to a line that transfers data to any one of the first to N-th synchronous data input buffers from any one of the first to N asynchronous data input buffers, and the loading value of the loading unit is such that the loading value of the line that transfers a clock signal from the clock input buffer to the any one of the first to N-th synchronous data input buffers is substantially equal to the loading value of the line that transfers the data from the any one of the first to N asynchronous data input buffers.

9. A semiconductor apparatus comprising:

a plurality of data pads each providing input data to an asynchronous data input buffer;

a plurality of data signal paths each transferring data, which was input through a corresponding one of the data pads and buffered by the asynchronous data input buffer of the corresponding one of the data pads, to a synchronous data input buffer;

a plurality of internal clock signal paths each corresponding to one of the data signal paths, each of the internal clock signal paths providing an internal clock from a clock input buffer to the synchronous data input buffer of the corresponding data signal path;

wherein, for each of the data signal paths, the length of the data signal path is substantially equal to the length of the corresponding internal clock signal path.

10. The semiconductor apparatus according to claim 9, wherein the plurality of data signal paths and the plurality of internal clock signal paths are provided through transmission lines, wherein each of the data signal paths is provided its own transmission line, and each of the internal clock signal paths is provided through a same transmission line.

11. The semiconductor apparatus according to claim 10, further comprising one or more loading units electrically connected to any one or more of the transmission lines of the data signal paths, wherein the loading unit electrically connected to a transmission line has a loading value set to compensate for loading of the internal clock signal performed by a synchronous data input buffer of a transmission line other than the transmission line to which the loading unit is electrically connected.

* * * * *